United States Patent
Lazar et al.

(10) Patent No.: US 7,801,441 B2
(45) Date of Patent: Sep. 21, 2010

(54) METHOD AND AN APPARATUS FOR THE TAKING OF AN IMAGE, IN PARTICULAR BY A CCD SENSOR

(75) Inventors: Markus Lazar, Nussdorf (DE); Marcus Steinbichler, Neuebeuern (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 538 days.

(21) Appl. No.: 11/345,464

(22) Filed: Feb. 1, 2006

(65) Prior Publication Data
US 2006/0222359 A1   Oct. 5, 2006

(30) Foreign Application Priority Data
Feb. 1, 2005 (DE) ........................ 10 2005 004 617
Aug. 4, 2005 (DE) ........................ 10 2005 036 770

(51) Int. Cl.
*G03B 41/00* (2006.01)
(52) U.S. Cl. .................................... 396/322; 348/219.1
(58) Field of Classification Search ................. 396/75, 396/118, 270, 322, 324; 348/208.99, 340, 348/219.1, 49, 50; 356/611
See application file for complete search history.

(56) References Cited

U.S. PATENT DOCUMENTS

| | | | | |
|---|---|---|---|---|
| 4,618,884 A | * | 10/1986 | Nagasaki | 348/65 |
| 4,920,418 A | * | 4/1990 | Robinson | 348/219.1 |
| 5,301,042 A | * | 4/1994 | Blanding | 358/474 |
| 5,363,136 A | * | 11/1994 | Sztanko et al. | 348/207.99 |
| 5,557,327 A | * | 9/1996 | Hasegawa et al. | 348/340 |
| 5,561,460 A | * | 10/1996 | Katoh et al. | 348/219.1 |
| 5,650,840 A | * | 7/1997 | Taniguchi | 355/55 |
| 5,712,685 A | * | 1/1998 | Dumas | 348/360 |
| 5,754,226 A | * | 5/1998 | Yamada et al. | 348/219.1 |
| 5,786,901 A | * | 7/1998 | Okada et al. | 358/474 |
| 5,834,761 A | * | 11/1998 | Okada et al. | 250/208.1 |
| 5,877,806 A | * | 3/1999 | Kawano | 348/219.1 |
| 5,889,553 A | * | 3/1999 | Kino et al. | 348/218.1 |
| 5,920,342 A | * | 7/1999 | Umeda et al. | 348/211.14 |
| 5,969,757 A | * | 10/1999 | Okada et al. | 348/219.1 |
| 6,266,086 B1 | * | 7/2001 | Okada et al. | 348/218.1 |
| 6,292,286 B1 | * | 9/2001 | Lim et al. | 359/209.1 |
| 6,473,121 B1 | * | 10/2002 | Shimada | 348/219.1 |
| 6,587,148 B1 | * | 7/2003 | Takeda et al. | 348/342 |
| 6,618,512 B1 | * | 9/2003 | Yamaguchi | 382/319 |
| 2002/0033975 A1 | * | 3/2002 | Yamazaki | 358/515 |
| 2005/0013646 A1 | * | 1/2005 | Blanding | 400/648 |
| 2005/0242268 A1 | * | 11/2005 | Oakley | 250/208.1 |

* cited by examiner

*Primary Examiner*—W. B. Perkey
(74) *Attorney, Agent, or Firm*—Dilworth & Barrese, LLP

(57) ABSTRACT

A camera comprises a line sensor or an areal sensor (1) and an optical imaging system (2) for the projection of an image onto the sensor (1). To increase the resolution, a displacement device (6) is provided for the displacement of the image relative to the sensor (1) (FIG. 2).

12 Claims, 2 Drawing Sheets

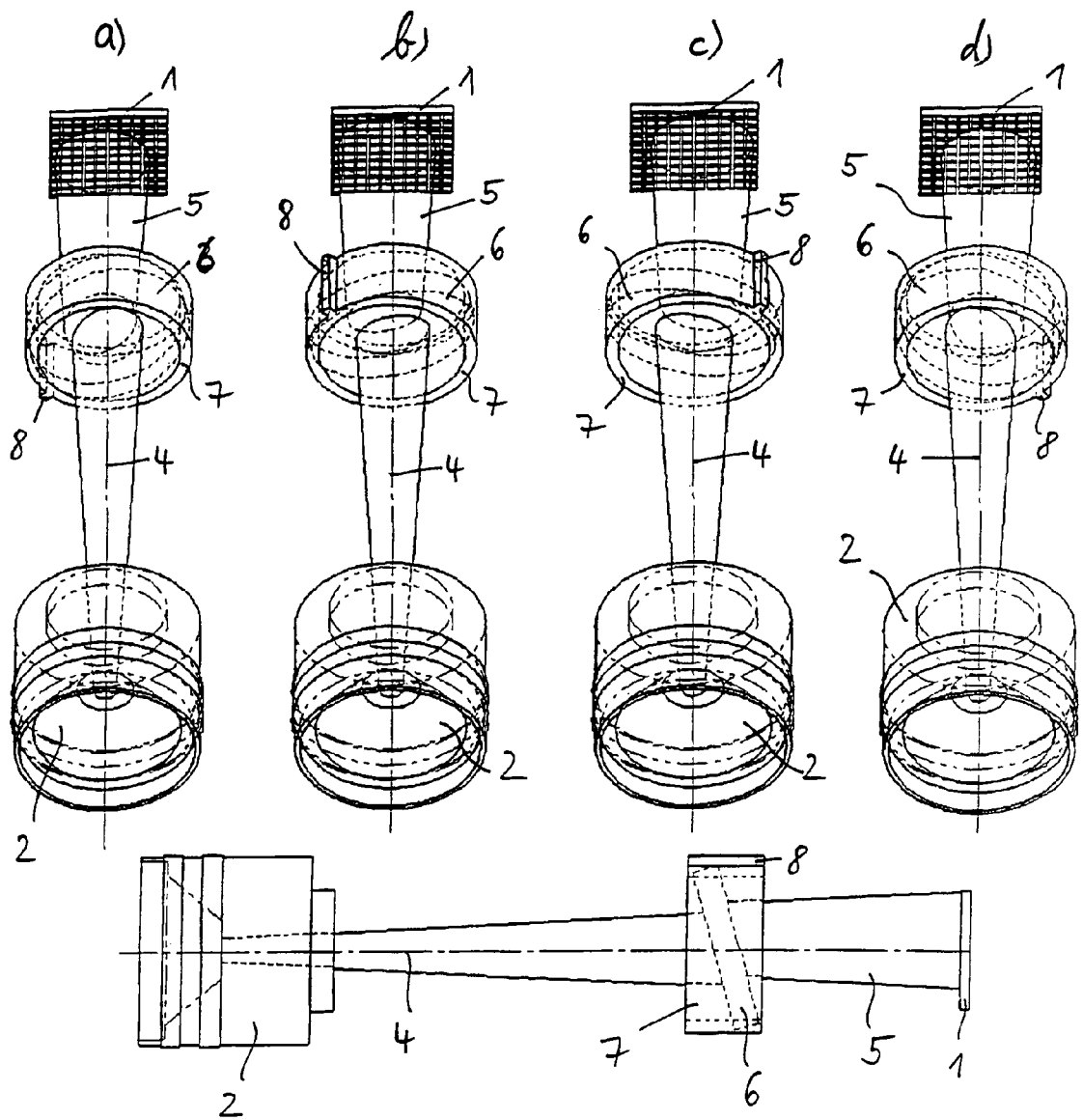

METHOD AND AN APPARATUS FOR THE TAKING OF AN IMAGE, IN PARTICULAR BY A CCD SENSOR

BACKGROUND OF THE INVENTION

The invention relates to a method for the taking of an image by a line sensor or an areal (or matrix) sensor, in particular a CCD sensor or a CMOS sensor, wherein the image is projected onto the sensor by an optical imaging system and is taken by the sensor. The invention further relates to a camera having a line sensor or an areal sensor, in particular a CCD sensor or a CMOS sensor, and an optical imaging system for the projection of an image onto the sensor.

Cameras of this type are already known. They can in particular be used in 3D measuring units. In these cameras, line sensors or areal sensors are used on which a plurality of photosensitive cells (pixels) are arranged in a regular manner, preferably in a rectangular or square manner. CCD sensors or CMOS sensors (CMOS chips or CMOS line sensors) are in particular used.

The resolution of such sensors is, however, limited. To increase the resolution, the number of pixels can be increased. When the pixel size remains the same, this results in larger sensors, whereby the influence of the optical aberrations becomes larger. When the pixels are made smaller, the signal-to-noise ratio of the image information is degraded.

To increase the resolution of the image, it is possible to displace the sensor by a specific fraction of the pixel spacing between two or more image shots, which can take place, for example, by a suitable actuator, for example a piezo-actuator. Additional information is thereby gained at the positions between the original pixels. The effort for the displacement of the sensor is, however, very high.

SUMMARY OF THE INVENTION

It is the object of the invention to provide an improved method and an improved camera of the initially recited kind.

In a method of the initially recited kind, this object is solved in that the image is displaced by a fraction of the pixel spacing relative to the sensor and is taken. The image can be displaced in the horizontal and/or vertical direction. It can be displaced by one or more displacements by a fraction relative to the sensor. The camera in accordance with the invention is characterized by a displacement device for the displacement of the image relative to the sensor. It preferably comprises an image processing device.

In accordance with the invention, the image is displaced by a fraction of the pixel spacing with respect to the sensor. The sensor is not moved in this process. However, the image rays are optically displaced. An increase in resolution can hereby be achieved with comparatively simple means. Furthermore, the further advantage can be achieved in specific applications that moiré effects can be reduced or avoided.

The invention further relates to a method for the taking of a color image using a line sensor or an areal sensor, wherein the image is projected onto the sensor by an optical imaging system and is taken by the sensor separated by color. In a method of this type, the object underlying the invention is solved in that the image is displaced by one or more pixel spacings relative to the sensor and/or the sensor is displaced by one or more pixel spacings relative to the image and the image is taken. In accordance with a known method, the color information is gained in that the respective adjacent pixel is subjected to one or more color filters, for example to one of three color filters, in particular to a red, a green and a blue color filter. Each pixel thus measures only one color value, for example red (R), green (G) or blue (B). The other two color values of the pixel are gained by interpolation of adjacent values. To increase the resolution, in accordance with the invention, the image is displaced relative to the sensor and/or the sensor is displaced relative to the image by a pixel spacing or by a whole-figure multiple of a pixel spacing and the image is taken. An interpolated value can hereby be replaced by a measured value. It can be achieved by a multiple displacement by this method that, with three color values, a piece of measured color information is gained for each pixel, whereby the resolution can be further increased. The displacement can take place in the horizontal and/or vertical direction. A camera in accordance with the invention, in which the image is projected onto the sensor separated by color by the optical imaging system, can also be used for this method.

The two solutions in accordance with the invention can be combined with one another. It is therefore possible to carry out a displacement by a pixel spacing in order to gain a further color value and additionally to carry out a displacement by a fraction of a pixel spacing to increase the resolution.

Advantageous further developments are described herein.

It is advantageous for the camera to comprise a plate which is arranged at an angle to the optical axis of the optical imaging system. The plate can preferably be a plano-parallel plate. It is, however, generally also possible to use a prismatic plate. The plate is preferably a glass plate. The plate can, however, also be manufactured from another transparent material, in particular from plastic.

The plate is preferably tiltable. It can be tiltable about two different axes. The tilt axes are preferably perpendicular to one another. They preferably extend horizontally and vertically. The tilt axes preferably extend parallel to the direction of arrangement of the pixels of the sensors. The tilt axes preferably extend transversely to the optical axis of the optical imaging system.

The plate can instead or additionally be pivotable. The plate is preferably pivotable around an axis which extends parallel to the optical axis of the optical imaging system or which is identical to the optical axis of the optical imaging system.

The invention further relates to a 3D measuring unit which is characterized by a camera comprising a line sensor or an areal sensor, an optical imaging system for the projection of an image, in particular of an image separated by color, onto the sensor, and a displacement device for the displacement of the image relative to the sensor and/or for the displacement of the sensor relative to the image. The invention in particular relates to a 3D measuring unit which is characterized by a camera in accordance with the invention.

BRIEF DESCRIPTION OF THE DRAWINGS

Embodiments of the invention will be explained in detail in the following with reference to the enclosed drawing. There are shown in the drawing FIG. 1 a plurality of schematic, perspective representations of a camera having a tiltable, plano-parallel glass plate;

FIG. 2 a camera having a pivotable, plano-parallel glass plate in a schematic side view; and FIG. 3 the camera in accordance with FIG. 2 in a plurality of schematic, perspective views.

DESCRIPTION OF THE PREFERRED EMBODIMENTS

Figure 1:
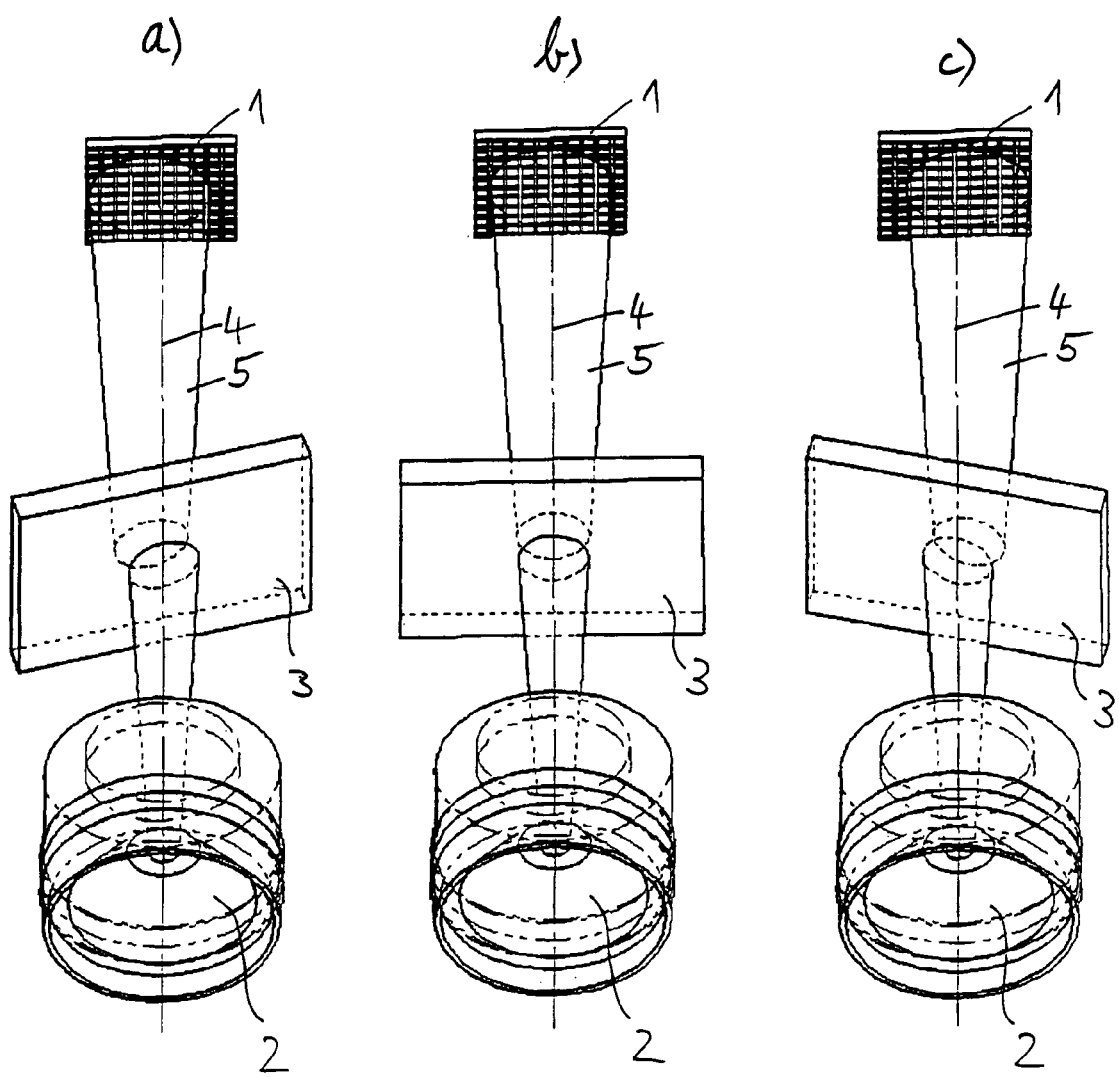

The camera shown in FIG. 1 comprises a CCD sensor 1 on which a plurality of pixels are present in a regular, rectangular arrangement. The photosensitive pixels are separated from one another by narrow, non-photosensitive stripes. The camera furthermore comprises an optical imaging system 2 by which an image is projected onto the CCD sensor 1 and is taken by this CCD sensor 1. The charge pattern of the CCD sensor is forwarded to an image processing device (not shown in the drawing). It can be stored there.

A plano-parallel glass plate 3 is arranged between the optical imaging system 2 and the CCD sensor 1 and is tiltable about a vertical axis intersecting the optical axis 4 of the optical imaging system 2. The plate 3 could also be provided in front of the optical imaging system 2 or in the optical imaging system 2. The starting position is shown in FIG. 1*b*, in which the piano-parallel glass plate 3 is perpendicular to the optical axis 4. In FIG. 1*a*, the plano-parallel plate 3 is tilted to the left; in FIG. 1*c*, it is tilted to the right. The bundle of rays 5, which is projected onto the CCD sensor 1, is displaced to the left (FIG. 1*a*) and to the right (FIG. 1*c*) by these tilting movements. The tilting of the glass plate 3, and thus the displacement of the bundle of rays 5 representing the image, take place by a predetermined amount which corresponds to a predetermined fraction of the pixel spacing in the horizontal direction.

The piano-parallel glass plate 3 can also be tiltable about a horizontal axis (not shown in the drawing) intersecting the optical axis 4 to achieve the same effect in the vertical direction.

The images taken at different tilt movements of the glass plate 3 are supplied to the image processing device and are processed there to form an image with enhanced resolution.

In the embodiment in accordance with FIG. 2, the camera likewise comprises a plate 6 which is arranged at an angle to the optical axis 4 of the optical imaging system 2. The glass plate 6 is also located between the optical imaging system 2 and the CCD sensor 1 here.

Unlike the embodiment in accordance with FIG. 1, the plano-parallel glass plate 6 is installed in a housing 7 which is pivotably supported around an axis which coincides with the optical axis 4 of the optical imaging system 2. The glass plate 6 can be fixedly installed in the housing 7. It can, however, also be adjustable in its inclination in the housing 7 to adjust it with respect to the CCD sensor 1 and/or to the optical imaging system 2 and/or to adjust it to different CCD sensors 1, optical imaging systems 2 and/or spacings thereof. The housing 7 has a cam 8 which is located at its outer periphery and by which a rotary movement into the housing 7 can be initiated.

Different displacements of the image projected onto the CCD sensor 1 can be achieved by a rotation of the housing 7 and thus of the plano-parallel glass plate 6. For example, displacements can be achieved by rotation by 90° in each case in the order to the left upwardly to the right downwardly.

The rotation of the housing 7 and thus the pivoting of the plano-parallel glass plate 6 can be interrupted after the reaching of the respectively required pivot position until the image has been completely taken with the respective displacement by the CCD sensor 1. If, however, the rotary speed of the housing 7 is low with respect to the sampling speed of the CCD sensor 1, the rotation of the housing 7 can also be carried out continuously.

The sampling of the CCD sensor 1 can preferably be synchronized with the rotary position of the housing 7 and thus of the glass plate 6.

The sampling can also take place in the manner that positions are run through at angular spacings of 90° which correspond to the following displacements:

to the bottom left (FIG. 3*a*)

to the top left (FIG. 3*b*)

to the top right (FIG. 3*c*)

to the bottom right (FIG. 3*d*).

The images taken at the different displacements are supplied to an image processing device and are there processed to form an image with higher resolution.

The camera in accordance with the invention comprises an optical imaging system, in particular a lens. The bundle of rays exiting the optical imaging system contains the image information. Depending on the angle of inclination of the plate, an image offset of the beam of rays relative to the optical axis and thus on the CCD sensor is achieved. The desired image offset can be achieved by adjustment of the tilt angle. The total image can be restored from the displaced images taken at different times using a computer-aided image processing connected afterward, and indeed at a higher resolution.

The invention claimed is:

1. A method of taking an image by a line sensor or an areal sensor comprising the steps of:

pivotably supporting a piano-parallel glass plate in a housing in front of or between an optical imaging system and a CCD sensor;

projecting an image by an optical imaging system onto the sensor and is taken by the sensor, displacing the piano-parallel glass plate by a predetermined amount corresponding to a fraction of the pixel spacing relative to the sensor by pivoting the plano-parallel glass plate in the housing and rotating the housing about an axis parallel to a optical axis of the optical imaging system; and re-projecting the image by the optical imaging system onto the sensor and is taken by the sensor.

2. A method in accordance with claim 1, wherein the image is displaced in the horizontal and/or vertical direction.

3. A camera comprising:

a line sensor or an areal sensor;

an optical imaging system for the projection of an image, in particular of an image separated by color, onto the sensor a plano-parallel glass plate pivotably supported in a housing for the displacement of the image relative to the sensor, the housing further effective to be rotated about an axis parallel to an optical axis of the optical imaging system so that images projected by the optical imaging system may be moved by a fraction of the pixel spacing in the line or areal sensor.

4. A camera in accordance with claim 3, comprising an image processing device.

5. A camera in accordance with claim 3, wherein the camera comprises a plate which is arranged at an angle to the optical axis of the optical imaging system.

6. A 3D measuring unit, comprising:

a camera comprising a line sensor or an areal sensor, an optical imaging system for the projection of an image, in particular of an image separated by color, onto the sensor, and a piano-parallel glass plate pivotably supported in a housing for the displacement of the image relative to the sensor, the housing further effective to be rotated about an axis parallel to an optical axis of the optical imaging system so that images projected by the optical imaging system may be moved by a fraction of the pixel spacing in the line or areal sensor.

7. A camera in accordance with claim 4, wherein the camera comprises a plate which is arranged at an angle to the optical axis of the optical imaging system.

8. The method according to claim 1, wherein the image is displaced by a fraction of the pixel spacing relative to the sensor.

9. A 3D measuring unit according to claim 6, comprising an image processing device.

10. A 3D measuring unit according to claim 6, wherein the camera comprises a plate which is arranged at an angle to the optical axis of the optical imaging system.

11. A method in accordance with claim 8, wherein the image and/or the sensor is/are displaced in the horizontal and/or vertical direction.

12. A method in accordance with claim 1, further comprising repeating said displacing and re-projecting steps.

* * * * *